United States Patent
Obeyesekere et al.

(10) Patent No.: US 10,611,951 B2
(45) Date of Patent: Apr. 7, 2020

(54) LIQUID INHIBITOR COMPOSITION AND A METHOD FOR ITS PREPARATION AND APPLICATION AS A HEAVY BRINE CORROSION CONTROL

(71) Applicant: Clariant International, Ltd., Muttenz (CH)

(72) Inventors: Nihal U. Obeyesekere, Houston, TX (US); Thenuka Ariyaratna, The Woodlands, TX (US); Jonathan James Wylde, The Woodlands, TX (US)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/534,307

(22) PCT Filed: Dec. 10, 2015

(86) PCT No.: PCT/EP2015/079234
§ 371 (c)(1),
(2) Date: Jun. 8, 2017

(87) PCT Pub. No.: WO2016/092010
PCT Pub. Date: Jun. 16, 2016

(65) Prior Publication Data
US 2017/0342310 A1 Nov. 30, 2017

Related U.S. Application Data

(63) Continuation of application No. 14/567,885, filed on Dec. 11, 2014, now abandoned.

(51) Int. Cl.
*C09K 8/54* (2006.01)
*C23F 11/14* (2006.01)
*C23F 11/167* (2006.01)
*C23F 11/16* (2006.01)
*C23F 11/10* (2006.01)

(52) U.S. Cl.
CPC ............. *C09K 8/54* (2013.01); *C23F 11/10* (2013.01); *C23F 11/149* (2013.01); *C23F 11/16* (2013.01); *C23F 11/163* (2013.01); *C23F 11/167* (2013.01); *C23F 11/1673* (2013.01); *C09K 2208/32* (2013.01)

(58) Field of Classification Search
CPC ....... C09K 8/54; C23F 11/149; C23F 11/1673
See application file for complete search history.

(56) References Cited

U.S. PATENT DOCUMENTS

| | | | |
|---|---|---|---|
| 3,623,979 A * | 11/1971 | Maddox, Jr. | C23F 11/149 252/392 |
| 4,046,197 A | 9/1977 | Gruesbeck, Jr. et al. | |
| 4,292,183 A | 9/1981 | Sanders | |
| 4,304,677 A | 12/1981 | Stauffer et al. | |
| 4,339,349 A * | 7/1982 | Martin | C23F 11/10 422/12 |
| 4,536,302 A | 8/1985 | Augsburger et al. | |
| 4,713,184 A * | 12/1987 | Zaid | C02F 5/14 507/236 |
| 4,728,446 A | 3/1988 | Doty et al. | |
| 4,784,778 A | 11/1988 | Shin | |
| 4,784,779 A | 11/1988 | Dadgar | |
| 4,849,171 A | 7/1989 | Murray | |
| 4,980,074 A | 12/1990 | Henson et al. | |
| 4,997,583 A | 3/1991 | Itzhak | |
| 5,785,895 A * | 7/1998 | Martin | C09K 8/54 252/389.23 |
| 5,976,416 A | 11/1999 | Brezinski | |
| 6,149,834 A | 11/2000 | Gall et al. | |
| 6,192,987 B1 | 2/2001 | Funkhouser et al. | |
| 6,395,225 B1 * | 5/2002 | Pou | C09K 8/06 422/14 |
| 6,511,613 B1 | 1/2003 | Cizek et al. | |
| 8,007,689 B2 | 8/2011 | Itzhak et al. | |
| 2006/0264335 A1 | 11/2006 | Penna et al. | |
| 2008/0274013 A1 | 11/2008 | Stevens et al. | |
| 2009/0057616 A1 | 3/2009 | Leinweber et al. | |
| 2011/0186299 A1 | 8/2011 | Pou et al. | |
| 2017/0342311 A1 | 11/2017 | Obeyesekere et al. | |

FOREIGN PATENT DOCUMENTS

| | | |
|---|---|---|
| EP | 0139260 | 5/1985 |
| EP | 0153192 | 8/1985 |
| EP | 0526251 | 2/1993 |
| EP | 2031095 | 3/2009 |
| EP | 2050806 | 4/2009 |
| WO | WO9841673 | 9/1998 |
| WO | WO0039359 | 7/2000 |
| WO | WO2004092447 | 10/2004 |
| WO | WO2009076258 | 6/2009 |
| WO | WO2010031963 | 3/2010 |
| WO | WO2012063055 | 5/2012 |

OTHER PUBLICATIONS

ThermoFisher Scientific, https://www.thermofisher.com/order/catalog/product/20150, accessed Aug. 6, 2018.*
International Search Report for PCT/EP2015/079235, dated Aug. 3, 2016.
International Preliminary Report on Patentability for PCT/EP2015/079234, dated Jan. 25, 2017.

* cited by examiner

*Primary Examiner* — Peter F Godenschwager
(74) *Attorney, Agent, or Firm* — Tod A. Waldrop

(57) ABSTRACT

A composition useful as corrosion inhibitor formulation for application in heavy brine systems, comprising at least one imidazoline; at least one sulfur synergist; at least one phosphate ester. In a preferred embodiment, the composition comprises additionally formulation bonding surfactant; and/or at least one solvent system.

27 Claims, No Drawings

LIQUID INHIBITOR COMPOSITION AND A METHOD FOR ITS PREPARATION AND APPLICATION AS A HEAVY BRINE CORROSION CONTROL

FIELD OF THE INVENTION

The invention described concerns corrosion inhibitors, especially corrosion inhibitors when applied to saturated and concentrated salt solutions. The application of these corrosion inhibitors is particularly suited to oilfield exploration, drilling, production and process systems where brines such as sodium chloride, calcium chloride, calcium bromide, zinc bromide, calcium nitrate and other salt brines and mixtures thereof (hereinafter also referred to as "heavy brines") are basic components for operation processes. The application of these inhibitors protects the metal surfaces that are exposed to the brines at ambient and elevated temperatures and where corrosion protection needs to be provided rapidly to reduce the corrosion rates to negligible levels.

BACKGROUND OF THE INVENTION

Heavy brines are used during many different stages of the oil and gas exploration, drilling and production cycle, particularly as a component of drilling fluids, packer fluids, work-over fluids, kill fluids and completion fluids. Packer fluids are used in the annulus of a well that surrounds the production tubing; work-over fluids are those used during remedial operations of a well; kill fluids are used to suspend a well either temporarily or permanently by hydrostatically over-balancing it with heavy brine; completion fluids are used after a well has been drilled but before the well has been brought online to production.

All applications rely on the same properties of the heavy brines and that is their density. In all instances the density of the fluid is tailored to ensure the hydrostatic head of the column of fluid is higher than that of the reservoir pressure, so as to prevent a blow-out, but not so heavy that the brine is lost to the formation, which can lead to irreparable skin damage. Different brines and mixtures of brines can be used to cater for the different formation pressures, depth of wells and orientation of wells. The lightest brine used is sodium chloride (NaCl) which is 1.2 g/cm$^3$ and the heaviest tends to be zinc bromide (ZnBr$_2$) which is 2.65 g/cm$^3$.

Heavy brines are used in drilling and well completion operations and can be is defined as a water containing a high concentration of dissolved inorganic salts. More specifically a heavy brine is defined as a water-based solution of inorganic salts used as a well-control fluid during the completion and work-over phases of well operations. Heavy brines are solids free, containing no particles that might plug or damage a producing formation. In addition, the salts in heavy brine can inhibit undesirable formation reactions such as clay swelling. Brines are typically formulated and prepared for specific conditions, with a range of salts available to achieve densities ranging from 8.4 to over 22 lb/gal (ppg) [1.0 to 2.65 g/cm$^3$] but more commonly from 10 to 18 lb/gal (ppg) [1.2 to 2.2 g/cm$^3$] and even more commonly between 11.5 to over 17 lb/gal (ppg) [1.4 to 2.0 g/cm$^3$]. A brine is considered to be a heavy brine in the sense of this invention if its density is 1.15 g/cm$^3$ or above, more preferably 1.2 g/cm$^3$ or above, still more preferably 1.4 g/cm$^3$ or above. The preferred upper limit of density is 2.65 g/cm$^3$. Preferred ranges of density are 1.2 to 2.65 g/cm$^3$, more preferably 1.4 to 2.2 g/cm$^3$, still more preferably 1.5 to 2.0 g/cm$^3$.

Common salts used in the preparation of simple brine or heavy brine systems may include, but are not limited to, single salts or mixtures of multiple salts comprising sodium chloride, calcium chloride, calcium nitrate and potassium chloride. More complex brine or heavy brine systems may include, but are not limited to, single salts or mixtures of multiple salts comprising calcium bromide, zinc bromide or zinc iodine salts. These complex brines are generally corrosive and costly.

A particular challenge with heavy brines is their corrosivity. This is brought about by a few different features of the heavy brines. Firstly, the heavy brines tend to be saturated with respect to oxygen; secondly the heavy brines are strongly electrolytic and allow for efficient electron transfer and therefore corrosion; finally the heavy brines themselves can be of a very low pH.

There are several patents relevant to the art of corrosion protection for heavy brine systems and these can be classified into sets based on the fundamental chemistries covered in their art.

The first set involves the use of metal salts. U.S. Pat. No. 8,007,689 utilizes metalloids of antimony or germanium. It further discloses a more complex blend of morpholine derivatives, an unsaturated alcohol and an organic acid with at least two of these components together in any given blend. The mechanism is likely to be oxygen scavenging from the reducing agents and also passivation of the metal surface using the metalloids.

U.S. Pat. No. 4,849,171 discloses the use of MgO used as an intensifier with super phosphate being contained in the overall blend. Again this is a passivating mechanism that offers the corrosion control.

U.S. Pat. No. 4,997,583 teaches arsenic salts as the corrosion inhibitor, either alone or in combination with an admixture of urea (as a synergist). Arsenic is $As_2O_3$, $AsBr_3$, or $NaAs_2O_5$ typically added at 200 ppm (arsenic).

US-2008/0274013 discloses the use of molybdenum oxide, and compounds based on antimony, copper and bismuth. These are used in combination with acetylenic amines or acetylenic alcohols.

EP-0153192 uses mono- and divalent salts of erythorbic acid and gluconate (sodium and iron salts). This can be made in a solid or liquid form. It is co-blended with alkali metals, specifically molybdate salts are added. The mechanism is unclear, but is postulated as scavenging combined with a chelation effect.

This set of patents all use metal salts where the metal component is invariably a very heavy element. Typically this means the metal salts are environmentally hazardous, as they can lead to non-competitive enzyme inhibition. This is a major drawback with these types of solutions as legislation typically would not allow their use.

The next set of patents is based around the use of sulfur containing compounds.

U.S. Pat. No. 4,536,302 discusses the use of sulfur compounds where the oxidation state is either 0 or >0. Thiocyanate or thio amide is used at concentrations as high as 1 g/L. Furthermore, the reference discloses the addition of a reducing sugar (mono-saccharide, disaccharide or oligosaccharides) such as glucose, fructose, lactose, etc. These sugars are added at even higher rates of 2 to 10 g/L.

U.S. Pat. No. 4,728,446 describes a corrosion inhibitor composition containing an alkali or alkaline-earth metal halide in water, zinc ions and thiocyanate ions.

U.S. Pat. Nos. 4,784,778 and 4,784,779 disclose the use of 2-mercaptoethanol, sodium, ammonia and/or calcium thiocyanate, with or without the addition of aldose based antioxidants such as arabinose, ascorbic acid, isoascorbic acid, gluconic acid etc. Ammonium thioglycolate is also mentioned as an additional component. It is noteworthy that very high concentration of inhibitor is required in the experimental data.

U.S. Pat. No. 4,980,074 discloses the corrosion inhibitor as a blend of soluble aliphatic or aromatic aldehydes with or without olefinic unsaturation in combination with an alkali metal, thiocyanates or ammonium thiocyanates.

EP-0139260 discusses phosphorus containing compounds and the use of phosphonium salts such as triphenylphosphine. This is in combination with thiocyanate as well as a commercial product being added called "TRETOLITE™ KI-86". "TRETOLITE™ KI-86" is disclosed as a Mannich amine-based formulation.

WO-2009/076258 teaches a bis-quaternized compound for inhibiting corrosion and/or removing hydrocarbonaceaus deposits in oil and gas applications, the compound having a general formula:

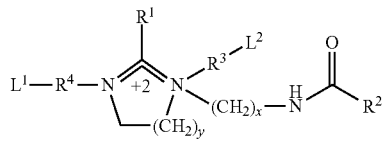

(a) wherein $R^1$, $R^2$, $R^3$ and $R^4$ are independently selected from the group consisting of: an unsubstituted branched, chain, or ring alkyl or alkenyl having from 1 to about 29 carbon atoms in its main chain; a partially or fully substituted branched, chain, or ring alkyl or alkenyl having from 1 to about 29 carbon atoms in its main chain, wherein said substitution includes being oxygenized, sulfurized, and/or phosphorylized; and combinations thereof;
(b) $L^1$ and $L^2$ is each a moiety independently selected from the group consisting of: —H, —$CO_2$H, —$SO_3$H, —$PO_3H_2$, —$CO_2R^4$, —$CONH_2$, —$CONHR^4$, —$CON(R^4)_2$, and combinations thereof; wherein each $R^4$ is independently selected from the group consisting of: branched or unbranched alkyl, aryk, alkylaryl, cycloalkyl, and heteroaromatic groups having from 1 to about 10 carbon atoms, and combinations thereof;
(c) x is from 1 to about 10; and
(d) y is from 1 to about 5,
which may be used together with a phosphate ester and a mercapto synergist.

WO-2012/063055 teaches compositions comprising at least one compound that is a ring-opened derivative of a $C_5$-$C_{21}$ alkylhydroxyethyl imidazoline and a quaternary ammonium compound. One group of compounds that have been found to be useful are amphoacetates, alkylamidoamineglycinates or amphocarboxyglycinates. Two other groups are di-acetates and amphosulfonates. The ring-opened derivatives of $C_5$-$C_{21}$ alkylhydroxyethyl imidazolines are disclosed be especially effective when used in combination with alkyl quaternary amines (alkyl quats) and/or alkyl quaternary esteramines (ester quats).

The corrosion caused by heavy brines is fundamentally different to that which occurs during normal production operations when regular brines are used. Regular brines are the subject matter of the WO-2009/076258 and WO-2012/063055 references. Corrosion in normal production operations (such as that described in WO-2009/076258 and WO-2012/063055) involves brines with a density <1.4 g/cm³ and are anoxic. This type of corrosion is caused by the dissolution of corrosive species, most typically $CO_2$ and $H_2S$.

Heavy brines on the other-hand offer the following unique problems to the oilfield production chemist:
In a first aspect they are highly saturated, often with reactive divalent ions. This poses a solubility problem for any corrosion inhibitor, something not usually encountered in less saturated, regular brines. This also promotes a more pervasive corrosion inhibition mechanism with such aspects as chloride stress corrosion cracking mechanism and also a higher general corrosion rate due to the high conductivity of the solution. The solubility of corrosion inhibitors is made all the more challenging when high levels of calcium, zinc, or bromide are present. Such ions are practically absent from standard oilfield produced waters (such as those detailed in cited prior art).
In a second aspect, oxygen corrosion will occur. Heavy brines are introduced into well operations from the surface and therefore are fully saturated with respect to oxygen. This is absolutely not the case with production operations where the produced waters are coming from the reservoir and flowing to the surface and therefore are completely anoxic. The presence of oxygen in the heavy brines creates a very severe corrosion environment and specific know-how and chemistry needs to be applied in order to deal with the oxygen present, such as that described in the current invention.

| | Table of heavy brine density vs. regular oilfield brines (WO-2009/076258 and WO-2012/0630553) | | | | |
|---|---|---|---|---|---|
| Component | Brine A WO-2012/063055 | Brine Table 3 WO-2009/076258 | NaCl Heavy Brine | CaCl2 Heavy Brine | KCl Heavy Brine |
| NaCl | 74.13 | 18.6793 | 311.265 | | |
| KCl | 0.71 | 0.225 | | | 252.43 |
| $MgCl_2 \cdot 6H_2O$ | 4.21 | 1.3284 | | | |
| $CaCl_2 \cdot 6H_2O$ | 17.19 | 0.8031 | | 540.632 | |
| $SrCl_2 \cdot 6H_2O$ | | 0.0578 | | | |
| $BaCl_2 \cdot 2H_2O$ | | 0.0023 | | | |
| $NaHCO_3$ | 0.68 | 2.5076 | | | |
| $Na_2SO_4$ | 0.02 | 0.9067 | | | |
| TDS (mg/L) | 86,226 | 22,527 | 311,265 | 540,632 | 252,430 |
| Density (g/cm³) | 1.096 | 1.024 | 1.198 | 1.389 | 1.162 |
| Density (PPG) | 9.14 | 8.54 | 10 | 11.6 | 9.7 |

Therefore it can be seen from this table that Brine A (WO-2012/063055) is fairly saline but is still much less that even the lightest brine (KCl) used in well service operations and general well work. Furthermore Brine A is a typical produced water composition and is composed of multiple salt compositions which is not the case for the artificially created heavy brines for completion and drilling operations.

WO-98/41673 teaches compositions for inhibiting the corrosion of iron and ferrous metals in heavy brines, comprising, as active constituent, at least one alkyl-poly(ethyleneamino)-imidazoline or 2-alkyl-poly-3-(ethyleneamino)-1,3-diazoline, corresponding to the general formula

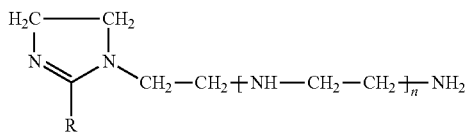

in which
R is a linear or branched, saturated or unsaturated hydrocarbon chain containing 10 to 22 carbon atoms, and in which n is a number from 0 to 3, and at least one mercapto acid corresponding to the general formula

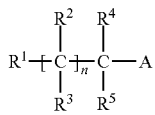

with
n is 0 to 3,
$R^1$ is H or SH,
$R^2$ and $R^3$ together or independently is $C_1$-$C_4$, $CON(R^6)(R^7)$ or $COOR^8$,
$R^4$ and $R^5$ together or independently is OH, $NH_2$ or SH when $R^1 \pm$ SH,
$R^6$ and $R^7$ together or independently is H or $C_1$-$C_4$,
$R^8$ is H or $C_1$-$C_8$,
it being possible for $R^2$ to $R^5$ to be included in an aromatic ring when n=1,
A being a COOH, $SO_3H$, $OSO_3H$, POSH or $OPO_3H$ acid group,
the molar ratio between the mercapto acid component(s) and the imidazoline component(s) being from 1.0 to 1.5.

In general the mechanism for sulfur containing compounds is one of passivating layer formation and is a very effective means of corrosion control. However there is an increased risk of stress corrosion cracking and several failures in the industry have been attributed to the reliance of sulfur containing compounds alone as effective corrosion control.

Film forming amines have also been discussed in the patent literature, but generally these are considered to be low performance and generally not compatible with a lot of heavy brine types.

U.S. Pat. No. 4,304,677 describes the use of several different additives for the heavy brines including corrosion inhibitors. Materials included corrosion inhibitors based on triethanolamine, propargyl alcohol, pyridine and its derivatives, the latter of which can be described as an amine-based film-former.

U.S. Pat. No. 4,292,183 discloses the use of commercial inhibitor packages such as "TRETOLITE™ KW-12" and "MAGCOBAR 101" which are described as film-forming amine-based corrosion inhibitor.

Other patents relevant to the art, use other types of chemistry.

U.S. Pat. No. 6,149,834 is not for oilfield use, rather is for inhibiting chloride salts used in de-icing application—relevant in a technical sense. Here the corrosion inhibitor is composed of de-sugared sugar beet molasses where 5 to 25 wt % is applied versus the chloride salt, furthermore small amounts of associated zinc and phosphorus salts were reported as boosting performance.

U.S. Pat. No. 4,046,197 names a commercial product (Corexit 7720) used in conjunction with a delivery system for a salt suspension.

WO-2000/039359 discloses the use of chelating agents such as 2-phosphonobutane-1,2,4-tricarboxylic acid (PBTC) and hydroxyphosphone-acetic acid (HPA) with phosphonocarboxylic acid (POCA). Azoles are also added such as mercapto benzotriazoles (MBT), benzotriazoles (BT), tolyltriazoles, etc.

Corrosion inhibitors for protection while using stimulation acids are also relevant because there are similarities in the arts when compared to heavy brine inhibitors.

US-2006/0264335 discloses the use of terpenes as intensifiers, for example carotene, limonene, camphor, menthol, etc.

U.S. Pat. No. 6,511,613 uses propargyl alcohol as the main inhibitor with iodine containing compounds as an intensifier. This is perhaps the most commonly used method in the art of protection against acidic corrosion inhibition.

U.S. Pat. No. 5,976,416 discusses a more classic approach, for organic acid corrosion inhibition, where quaternary ammonium salts and activators are combined with thioglycolic acid and thiosulfates.

U.S. Pat. No. 6,192,987 discloses the use of one or more acetylenic alcohols and hexamethylene-tetra-amine.

The intention of the current invention is to deliver new corrosion inhibitor formulations that lower the corrosion rates to negligible levels in heavy brine fluids. A corrosion rate may be considered to be negligible if it is <4 milli-inches per year, hereinafter mpy. It is further, an object of the present invention to provide much higher performance than the existing art. It is further, an object of the present invention to be applicable and compatible in all oil industry used heavy brine types including calcium nitrate which is often not specifically mentioned in the art. It is further, an object of the present invention to provide a product that can function efficiently and to the desired level of corrosion control without the addition of an oxygen scavenging, or reducing agent. It is further, an object of the current invention to provide corrosion protection particularly at high temperature, as well as low temperature performance, due to the trend to drill deeper, hotter, higher pressure wells. It is further, an object of the present invention to provide a corrosion inhibitor that is composed completely of organic based components with no salts or inorganic components, and especially no heavy metals, therefore providing an environmentally acceptable corrosion inhibitor package. It is further another object of the present invention to provide a corrosion inhibitor that does not induce, or contribute to in any way, additional risk of stress corrosion cracking. Yet another objective of the present invention is to prepare a corrosion inhibitor package composed of several ingredients and combination of ingredients to allow flexibility and therefore a more ubiquitous use around the world given the different legislations in place. Still another object of the present invention is to provide a formulation that kinetically reduces the corrosion rate much faster than any other products described in the art.

These and other objectives of the present invention are described in more detail within this Application and will be described below.

SUMMARY OF THE INVENTION

In a first aspect, the present invention provides the use of a composition comprising
1. at least one imidazoline,
2. at least one sulfur synergist, and
3. at least one phosphate ester, as corrosion inhibitor in a heavy brine having a density of 1.15 to 2.65 g/cm$^3$.

In a preferred embodiment, the composition comprises additionally
4. formulation bonding surfactant; and/or
5. at least one solvent system.

In a second aspect, the present invention provides a method for inhibiting corrosion caused by heavy brines, the method comprising adding the composition of the first aspect as corrosion inhibitor to heavy brine containing systems having a density of 1.15 to 2.65 g/cm$^3$.

In a third aspect, this invention relates to the use of a phosphate ester to improve corrosion inhibition in a heavy brine, the heavy brine comprising at least one imidazoline and at least one sulfur synergist and having a density of 1.15 to 2.65 g/cm$^3$.

In a preferred embodiment of the instant invention the composition will contain at least one component from each of groups 1, 2, and 3.

In another preferred embodiment, a component from group 4 is present with the components from each of groups 1, 2, and 3.

In another preferred embodiment, a component from group 5 is present with the components from each of groups 1, 2, and 3.

In another preferred embodiment, both components from groups 4 and 5 are present with the components from each of groups 1, 2, and 3.

Group 1

The compounds according to group 1 are preferably prepared by the condensation of an ethylenediamine compound (I) with an acid or ester compound (II) that results in the formation of an imidazoline (III) and an amidoamine (IV).

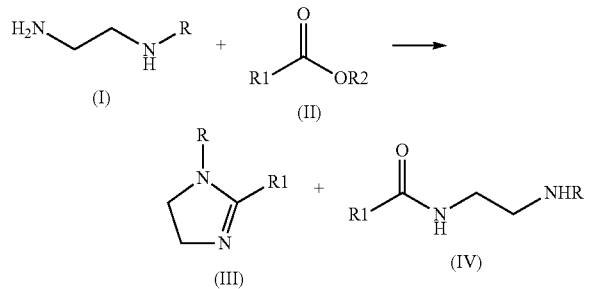

In formulae I, III and IV,
R is —H, —C$_2$H$_4$NH$_2$, —C$_2$H$_4$OH, —(C$_2$H$_4$NH)$_x$—C$_2$H$_4$NH$_2$, x is a number from 0 to 200,
R1 is a C$_3$ to C$_{29}$ aliphatic hydrocarbon group.

Formula II depicts an ester.

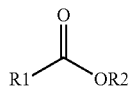

In formula II R2 is H or a residue derived from Methanol, Ethanol, Isopropanol, Glycol or Glycerol by abstraction of one hydrogen atom from an OH group.

In a preferred embodiment, R1 is selected from straight alkyl, mono unsaturated alkenyl, di unsaturated alkenyl, tri unsaturated alkeny, oligo unsaturated alkyl, branched alkyl and cyclic alkyl. More preferred R1 has a chain length of 7 to 21, particularly of 11 to 17 carbon atoms. Likewise more preferred is that R1 is selected from linear or branched alkyl, monounsaturated alkenyl or diunsaturated alkenyl. R1 may represent a natural occurring hydrocarbon distribution or mixtures of the above mentioned hydrocarbon moieties. R1 is the carbon chain of the acid or ester compound (II). The acid or ester compound (II) is preferably selected from tall oil fatty acid and its derivatives (TOFA), coconut oil and its derivatives, tallow fatty acid and its derivatives (Tallow), naphthenic acids and its derivatives, soya fatty acid and its derivatives (Soya), oleic acid and its derivatives.

The ethylenediamine compound (I) is preferably selected from tetraethylenepentamine (TEPA), diethylenetriamine (DETA), triethylentetramine (TETA), aminoethylethanolamine (AEEA) or any other polyethylendiamine.

The structure of an imidazoline has been described in the Figure below.

R results from the ethylenediamine compound substitution and, as described above, most commonly is either TEPA, TETA, DETA, AEEA and polyamine. Generally however it can be any type of ethylendiamine containing compound.

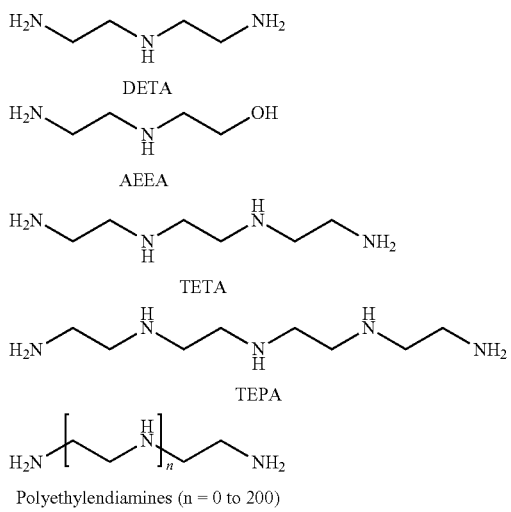

Polyethylendiamines (n = 0 to 200)

There are many commercial imidazolines available and the choice of imidazoline is wide and for the current corrosion inhibitor formulations may include, but not be limited to, 1:1 (molar ratio) TOFA/DETA imidazoline, 2:1 TOFA/DETA amido imidazoline, 1:1 TOFA/TETA imidazoline, 2:1 TOFA/TETA amido-imidazoline, 2:1 TOFA/TETA bisimidazoline, 1:1 TOFA/TEPA imidazoline, 2:1 TOFA/TEPA amido imidazoline, 2:1 TOFA/TEPA bis imidazoline, 3:1 TOFA/TEPA amido bisimidazoline, 1:1 TOFA/AEEA imidazoline, 2:1 TOFA/AEEA amido imidazoline, 1:1 TOFA/polyamine imidazoline, 2:1 TOFA/polyamine imidazoline, 2:1 TOFA/polyamine amido imidazoline, 2:1 TOFA/polyamine bisimidazoline, 3:1 TOFA/TEPA polyamine amido bisimidazoline, 1:1 Soya/DETA imidazoline, 2:1 Soya/DETA amido-imidazoline, 1:1 Soya/TETA imidazoline, 2:1 Soya/TETA amido-imidazoline, 2:1 Soya/TETA bismidazoline, 1:1 Soya/TEPA imidazoline, 2:1 Soya/TEPA amido imidazoline, 2:1 Soya/TEPA bisimidazoline, 3:1 TOFA/TEPA amido bisimidazoline, 1:1 Soya/AEEA imidazoline, 2:1 Soya/AEEA amidoimidazoline, 1:1 Soya/polyamine imidazoline, 2:1 Soya/polyamine imidazoline, 2:1 Soya/polyamine amido imidazoline, 2:1 Soya/polyamine bisimidazoline, 1:1 Tallow/DETA imidazoline, 2:1 Tallow/DETA amido-imidazoline, 1:1 Tallow/TETA imidazoline, 2:1 Tallow/TETA amido-imidazoline,2:1 Tallow/TETA bismidazoline, 1:1 Tallow/TEPA imidazoline, 2:1 Tallow/TEPA amido imidazoline, 2:1 Tallow/TEPA bisimidazoline, 3:1 Tallow/TEPA amido bisimidazoline, 1:1 Tallow/AEEA imidazoline, 2:1 Tallow/AEEA amidoimidazoline, 1:1 Tallow/polyamine imidazoline, 2:1 Tallow/polyamine imidazoline, 2:1 Tallow/polyamine amido imidazoline, 2:1 Tallow/polyamine bisimidazoline and 3:1 Tallow/TEPA poly amine amido bisimidazoline—there are also products that have different molar ratios of acid to amine and all molar ratios can be considered for the corrosion inhibiting formulations in the instant Application. The molar ratios above refer to the molar amounts of the compounds according to formulae (I) and (II), and their reaction may form a mixture of the compounds according to formulae (III) and (IV).

The imidazoline is preferably selected from TOFA-DETA imidazoline, TOFA-polyamine imidazoline or TOFA-TEPA imidazoline.

One preferred embodiment of the invention is to use a 1:1 Tallow/DETA imidazoline as described in the formula below:

Tallow fatty acid and diethylene triamine

Another preferred embodiment is to use a 1:1 Tallow/TEPA imidazoline as described in the Figure below:

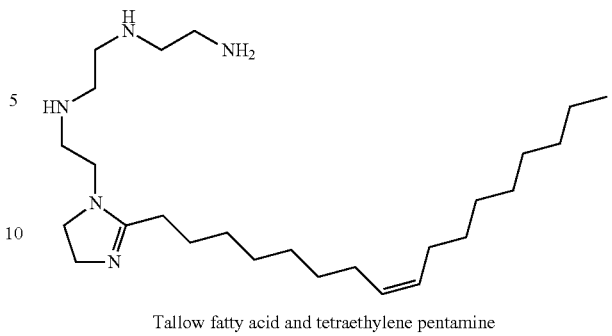

Tallow fatty acid and tetraethylene pentamine

Yet another preferred embodiment is to use a 1/1 Soya/AEEA imidazoline as described in the Figure below:

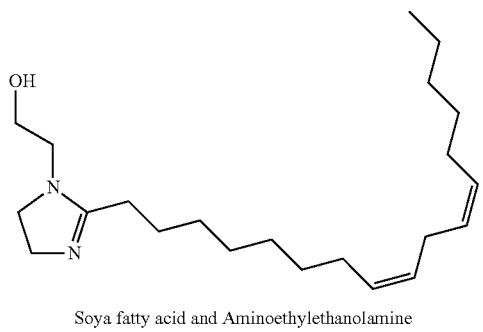 [SMILES: CCCCC/C=C\C/C=C\CCCCCCCC1=NCCN1CCO]

Soya fatty acid and Aminoethylethanolamine

Group 2

The sulfur synergists are generically any sulfur containing compound, either ionic or covalent by nature The preferred sulfur synergists fall into 5 generic categories as described by the following formulae:

$C_nH_{2n+1}SH$ wherein n is a number from 1 to 18

$M_x(S_2O_3)_y$, wherein, x=2 and y=1 and M=Li, Na, K, Ag, Cu or NH4;
x=1 and y=1 and M=Mg, Ca, Sr, Cu, Zn, Pb or Fe;
x=2 and y=3 and M=Al, Bi or Fe $M(SCN)_x$ where x=1 and M=Li, Na, K, Ag, Cu or NH4;
x=2 and M=Mg, Ca, Sr, Cu, Zn, Pb or Fe;
x=3 and M=Al, Bi or Fe $M(HSCH_2COO)_x$ where x=1 and M=Li, Na, K, Ag, Cu or NH4;
x=2 and M=Mg, Ca, Sr, Cu, Zn, Pb or Fe;
x=3 and M=Al, Bi or Fe $S=C(NH)_2R5R6$ where R5 and/or R6 are H, $C_1$ to $C_{10}$ alkyl, $C_2$ to $C_{10}$ alkene or $C_5$ to $C_9$ aryl groups or mixtures/polymers thereof.

The sulfur synergists are preferably selected from the group consisting of thioglycolic acid, sodium thiosulfate, ammonium thiosulfite, ammonium thiosulfate, sodium thiosulfate, potassium thiosulfate, potassium thiosulfite, thiourea, sodium thiocyanate, ammonium thiocyanate, and calcium thiocyanate, sodium thioglycolate, ammonium thioglycolate, polythioureas and derviatives such as 1,2-diethylthiourea, propylthiourea, 1,1-diphenylthiourea, thiocarbanilide, 1,2-dibutylthiourea, dithiourea thioacetamide, thionicotimide, or thiobenzamide, 2-Mercpatoethanol, 3-(Methylthio)propanal, thioacetic acid, cyste-amine, 3-Chloro-1-propanethiol, 1-mercapto-2-propanol, 2,3-Dimercapto-1-propanol, 2-Methoxyethane-thiol, 3-Mercapto-1-propanol, 2,3-Dimercapto-1-propanol, 1-Thio-glycerol, 1,3-Propane-dithiol, mercaptosuccinic acid, Cysteine, N-Carbomoyl-L-cysteine, N-Acetylcysteamine, 4-Mercapto-1-butanol, 1-Butanedithiol, 1,4-Butanedithiol, 2,2'-Thiodietanethiol, 4-Cyano-1-butanethiol, Cyclopantanethiol, 1,5-Pentanedithiol, 2-Methyl-1-butanethiol, 2,3,5,6-Tetrafluorobenzenethiophenol, 4-Chlorothiophenol, 2-Mercaptophenol, Thiophenol, Cyclohexylthiol, 4-Mercaptobenzoic acid, Thiosalicylic acid, 2-Ethylhexane thiol.

One preferred sulfur synergist is thioglycolic acid whose structure is:

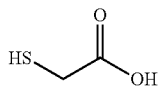

In another preferred embodiment, 2-mercaptoethanol is used, whose structure is:

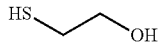

In yet another preferred embodiment, ammonium thiosulfate is used, whose structure is:

(NH$_4$)$_2$S$_2$O$_3$

Group 3

The phosphate esters or organophosphates are preferably of the generic formula:

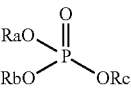

wherein Ra, Rb and Rc independently are selected from H or a hydrocarbon group, which may contain oxygen or nitrogen atoms, with a carbon atom number ranging from 1 to 49.

In a preferred embodiment, at least one of Ra, Rb and Rc are ethoxy groups.

In another preferred embodiment, said hydrocarbon group is composed of an alkyl or alkenyl residue. In another preferred embodiment, the number of carbon atoms in Ra, Rb or Rc is from 4 to 30 carbon atoms, preferably 8 to 22, more preferably 12 to 18 carbon atoms.

Ra, Rb and Rc may be terminated by hydrogen. The terminal hydrogen atom may be substituted by hydroxyl, benzyl or carboxylic acid groups. The carbon chains themselves may be saturated or unsaturated depending on the source of the carbon chain species or degree of ethoxylation. In one embodiment, they contain intra-hydrocarbon chain groups such as carboxyl group (—COO—), oxygen (—O—), or a secondary amine group (—NH—). Intra-hydrocarbon means that such groups are not terminal groups.

In another preferred embodiment of the invention phosphoric acid 2-ethylhexylester is the phosphate ester species used, the structure of which has been displayed below:

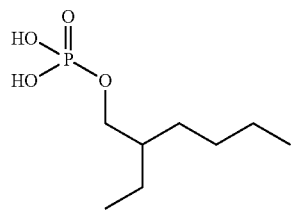

In another preferred embodiment of the invention uses poly(oxy-1,2-ethanediyl) alpha-isotridecyl-omega-hydroxy-, phosphate:

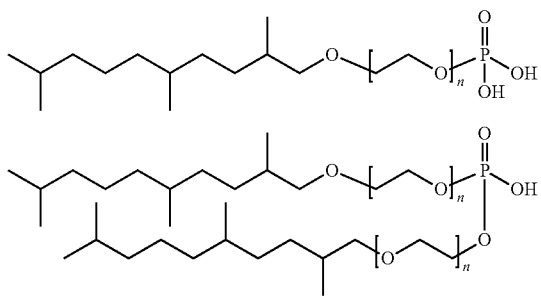

Yet another preferred embodiment of the invention uses 2-Ethyl hexyl mono/di phosphoric acid ester, acid:

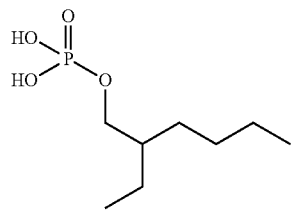

Yet another preferred embodiment of the invention uses cocos alkyl phosphoric acid ester:

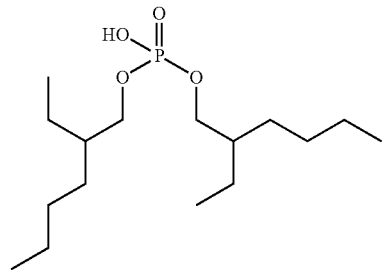

Yet another preferred embodiment of the invention uses lauryl polyoxethyl (4EO) phosphate ester sodium salts:

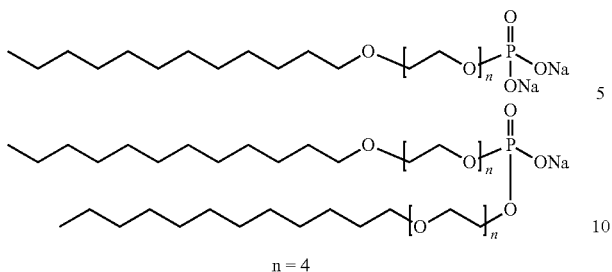
n = 4
Yet another preferred embodiment of the invention uses stearyl polyoxethyl (4EO) phosphate ester sodium salts:
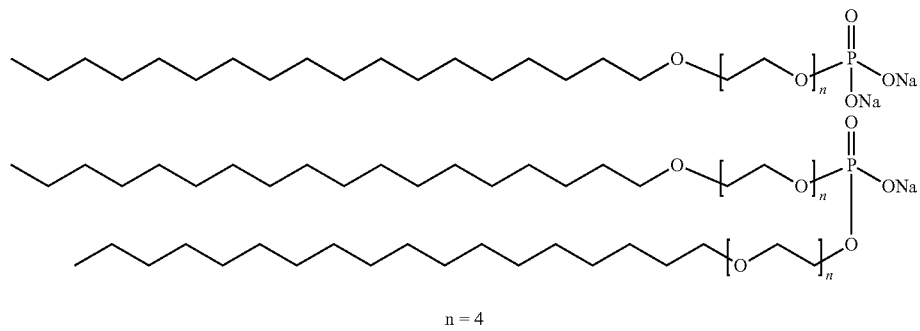
n = 4
Yet another preferred embodiment of the invention uses oleyl polyethoxy phosphoric acid ester (5 EO):
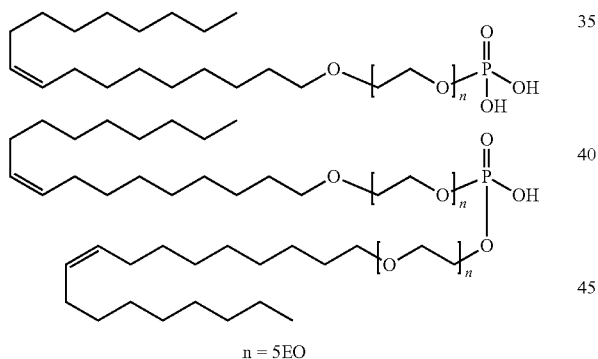
n = 5EO
Yet another preferred embodiment of the invention uses tristyryl phenol ether phosphate, acid form:
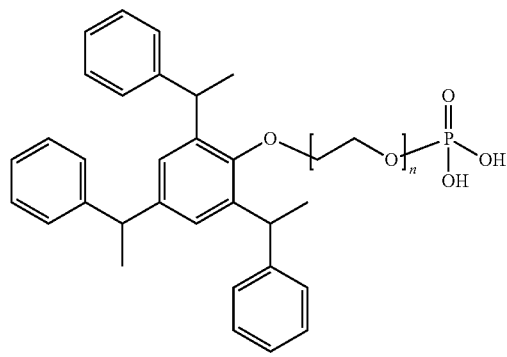

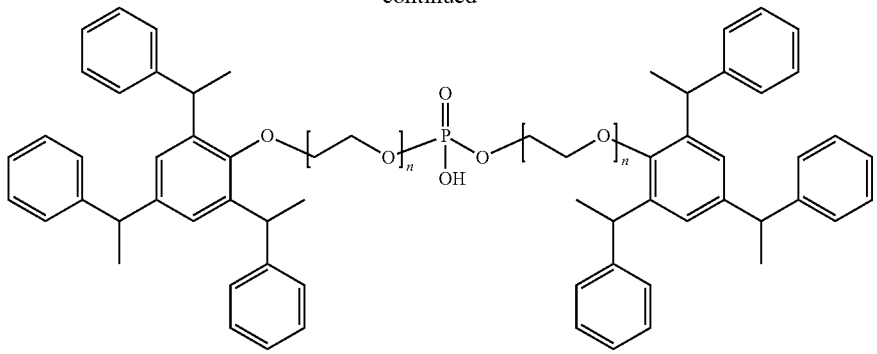

To one skilled in the art it is well known that the use of straight chained alkyl or alkenyl groups for Ra, Rb and Rc versus highly branched groups is preferred when one considers the biodegradation of the final phosphate ester molecule. A highly branched alkyl or alkenyl grouped phosphate ester displays a much higher biodegradation as naturally occurring bacteria are more able to degrade the molecule when compared to a straight chained alkyl or alkenyl group. Furthermore the mono- to di-ester ratio is a variable that has been discovered to affect the emulsion forming tendency of the phosphate ester molecule when oil and water mixtures are present. This is also known to one skilled in the art where highly mono-ester rich phosphate esters do not promote the formation of oil-water emulsions and the presence of high concentrations of di-ester phosphate esters have a tendency to create more persistent oil-water emulsions.

Group 4

The formulation bonding surfactants comprise the last group of components that bind the synergistic blend of other components together. The definition of a bonding surfactant in this context is a component that enables the blend of all components to remain as a single phase with no separation or precipitation of solids. The addition of this component is necessary typically because the components from Groups 1, 2 and 3 display surfactant like properties and can be of a very varied Hydrophilic Lipophilic Balance (HLB). As a result of this it is very typical for these components to be otherwise incompatible with one another due to immiscibility. The addition of a bonding surfactant (or mutual solvent) modifies the surface tension between the components to become more equal to one another and therefore enabling a single phase formulation.

There are a number of different formulation bonding surfactants that can be used and these should be known to people skilled in the art. The five classes of compounds for this purpose are:

a. Morpholine and its derivative according to the following formula:

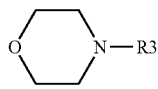

wherein R3 is H, $C_1$ to $C_{18}$ alkyl, $C_1$ to $C_8$ alkylamine, or

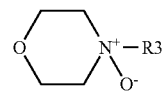

wherein R3 is H, $C_1$ to $C_{18}$ alkyl, $C_1$ to $C_8$ alkylamine,

The morpholine compounds may comprise alkyl morpholine and its derivatives, alkylaminomorpholine and its derivatives, alkyl morpholine oxides, alkylaminomorpholine oxide and its derivatives or any other morpholinyl structure. In one preferred embodiment, N-methylmorpholine was used; in another preferred embodiment, N-ethylmorpholine was used; in yet another preferred embodiment, N-methylmorpholine oxide was used; in yet another preferred embodiment, Aminopropylmorpholine was used.

b. Nonyl phenol ethoxylates: the nonyl phenol ethoxylates were used to assist the formulation of components described above to bond together. The degree of ethoxylation can range from 4 moles of ethylene oxide (EO) to 100 moles of ethylene oxide. The degree of ethoxylation is preferably from 6 to 60, more preferably from 9 to 40. In one preferred embodiment, a nonyl phenol ethoxylate with 4 moles of EO was used; in another preferred embodiment a nonyl phenol ethoxylate with 6 moles of EO was used; in yet another preferred embodiment, a nonyl phenol ethoxylate with 9 moles of EO was used; in yet another preferred embodiment a nonyl phenol ethoxylate with 60 moles of EO was used.

c. Ethoxylated alcohols according to the formula

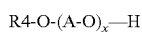

wherein
R4 is an aliphatic $C_8$ to $C_{18}$ hydrocarbon residue,
A is an ethylene group, and
x is a number from 2 to 100.
Preferably, R4 is alkyl or alkenyl. R4 may either be straight chain or branched. Preferably, R4 comprises from 12 to 16 carbon atoms. In another preferred embodiment, x is a number from 7 to 40, more preferably from 10 to 20.
In one preferred embodiment, a linear $C_{12}/C_{14}$ alcohol with 7 moles of EO was used; in another preferred embodiment, a coconut ($C_{12}$ to $C_{16}$) fatty alkyl ethoxylate was used with 20 moles of EO; in yet another preferred embodiment, a $C_{13}$ branched (isotridecyl) alcohol was used with 40 moles of EO was used; in yet another preferred embodiment, a $C_{12}/C_{15}$ oxo alcohol ethoxylate with 10 moles of EO was used.

d. Ethoxylated alkylamines according to the formula

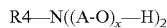

wherein
R4 is an aliphatic $C_6$ to $C_{18}$ hydrocarbon residue,
A is an ethylene group, and
x is a number from 2 to 100.
or

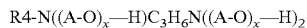

wherein
R4 is an aliphatic $C_6$ to $C_{18}$ hydrocarbon residue,
A is an ethylene group, and
x is a number from 2 to 100.
or

wherein
R4 is an aliphatic $C_6$ to $C_{18}$ hydrocarbon residue,
A is an ethylene group, and
x is a number from 2 to 100.

Preferably, R4 is derived from fatty amines ranging from $C_6$ to $C_{18}$ hydrocarbon groups, either linear or branched, either saturated or unsaturated, single carbon chain lengths or mixed carbon distributions, with EO ranging from 2 moles to 100 moles. In one preferred embodiment, a coconut fatty amine ethoxylate with 10 moles of EO was used; in another preferred embodiment, an oleic amine ethoxylate with 15 moles of EO was used; in yet another preferred embodiment, a tallow alkyl amine ethoxylate with 15 moles of EO was used; in yet another preferred embodiment, a tallow propylene diamine/lauryl dipropylene triamine ethoxylate with 20 moles of EO was used.

The suitability of a bonding surfactant is typically determined by the HLB of the given component relative to the other component in a blend. Furthermore all components from Group 4 a, b, c and d contain an ether group may contribute to the bonding mechanism of the other components.

As an example if a blend of components 1, 2 and 3 as described previously had a difference in HLB greater than 5 then it is very typical to require a bonding surfactant. The bonding surfactant is required to have an HLB that is in-between the HLB of the other components. For example if a component from Group 1 had an HLB of 5 and a component from Group 3 had an HLB of 15 and were otherwise incompatible, the bonding surfactant requires an HLB of 10 to be most effective.

Group 5

The solvent systems comprise a simple group of components that form the make up or remainder of the formulation. In a preferred embodiment the solvent system comprises one or more components selected from the group consisting of water, monohydric alkyl alcohols having 1 to 8 carbon atoms, dihydric alcohols having 2 to 6 carbon atoms and $C_1$ to $C_4$ alkyl ethers of said alcohols. More preferably, group 5 comprises water, methanol, ethanol, monoethylene glycol, triethylene glycol, 2-butoxyethanol, 2-ethylhexanol, isopropanol, pentanol, butanol, or mixtures thereof.

In a preferred embodiment a blend of water and methanol is used; in another preferred embodiment a blend of water, monoethylene glycol and 2-butoxyethanol is used; in yet another preferred embodiment, a blend of water, methanol and 2-butoxyethanol is used.

The corrosion inhibitor of the instant invention is preferably used in heavy brines that comprise a single salt, or blend of salts, selected from sodium chloride, potassium chloride, calcium chloride, calcium bromide, calcium nitrate, zinc chloride and zinc bromide. The metals that are protected by the corrosion inhibitor are most commonly carbon or mild steels; the corrosion inhibitor can also however be used to protect more exotic metallurgies such as high chromium-alloyed steels. An embodiment of the invention ideally reduced the corrosion rate of a stated salt solution to below 4 mpy.

In a preferred embodiment of the invention, the corrosion inhibitor comprises an imidazoline and at least two compounds selected from Group 2 and 3 described above. In a preferred embodiment the said two compounds are selected from 2-mercaptoethanol, ammonium thiosulfite, thioglycolic acid, phosphoric acid 2-ethylhexylester, poly(oxy-1,2-ethanediyl), alpha-isotridecyl-omega-hydroxy-, phosphate. In addition to this, the preferred embodiments also contain components from Group 4 and 5 selected from morpholine derivatives, nonyl phenol ethoxylate, lauryl alkoxylated, amine alkoxylated, monoethylene glycol, 2-butoxyethanol, water, and methanol.

The composition of one embodiment of the present invention is preferably prepared by combining:
1 to 20 wt.-% of the imidazoline described above,
1 to 10 wt.-% of the sulfur synergist described above,
1 to 30 wt.-% of the phosphate ester described above,
1 to 20 wt.-% of the bonding surfactant described above, and
20 to 80 wt.-% of the solvent system described above.

The inventive composition is preferably added to the specific heavy brine for application as corrosion inhibitor in concentrations between 100 and 10,000 mg/L. The exact concentration will depend on the heavy brine type, static conditions, materials of construction of the medium being treated, quality of the water being used to make up the heavy brine and length of time protection is to be provided to the heavy brine fluid. At this concentration range, the system provides corrosion protection in order to improve the integrity of the media being treated.

Most of the commercially available heavy brine corrosion inhibitor systems for these applications are either single components added sequentially to heavy brine, or have been formulated with components that only provide limited functionality, when compared to the current high performance embodiments of the instant invention. Additionally, the commercially available treating solution is of limited inhibition efficiency or temperature stability. Another problem related to the prior art systems is that the kinetics of functionality are slow, the time to achieve maximum inhibition efficiency can take several days due to interactions between the components of the prior art corrosion inhibitor packages and the heavy brine itself.

The present invention also includes a process for applications using the compositions above for application in heavy brines to be deployed in drilling and production cycle, particularly as a component of drilling fluids, packer fluids, work-over fluids and completion fluids.

The injected heavy brine may be sodium chloride, potassium chloride, calcium chloride, calcium bromide, zinc bromide, calcium nitrate and other salt brines and mixtures thereof. The instantly described corrosion inhibiting composition is added to the heavy brine and injected into the application to provide corrosion protection. The injection fluid may additionally contain, other ingredients known to those familiar with the art, including but not restricted to acids, dispersants, viscosifiers, lubricity agents, scale inhibitors, friction reducers, crosslinker, surfactants, scavenger pH adjuster, iron control agents, breakers; this is especially true if any produced water (or recycled water) is used to perform the treatment.

Employing the embodiments of the instant invention improves nullification of the heavy brine to render it benign and non-corrosive and damaging to the integrity of the metallurgy and equipment it will be used to treat, thus allowing better integrity management and control and corrosion inhibition protection. Other applications of the embodiments of the instantaneous invention include treating water for downhole injection for pressure support, treatment of water for drilling and work-over use, wettability alteration and well cleanout.

EXAMPLES

If not stated otherwise, references to % or ppm mean volume—% or volume—ppm throughout this specification.

In order to clearly and demonstrably illustrate the current invention, several examples have been presented below, these are however, non-limiting and have been specifically chosen to show those skilled in the art, the logic taken to arrive at the final formulations.

In order to evaluate the corrosion inhibition efficacy of the formulations, two different test methods were employed: rotating cylinder electrode (RCE) tests and high pressure, high temperature (HPHT) autoclave weight loss tests. For all testing displayed the following brine compositions were used:

Fully saturated $Ca(NO_3)_2$ brine (Brine 1), salt concentration $Ca(NO_3)_2 \cdot 4H_2O$ 2,126 g/L (approximately 10.8 pounds per gallon—hereafter referred to as PPG or 1.29 $g/cm^3$);
super saturated $Ca(NO_3)_2$ brine (Brine 2), salt concentration $Ca(NO_3)_2 \cdot 4H_2O$ 2,785 g/L (approximately 12.5 PPG or 1.49 $g/cm^3$);
fully saturated $CaCl_2$ brine (Brine 3), salt concentration $CaCl_2 \cdot 2H_2O$ 667 g/L (approximately 11.6 PPG or 1.38 $g/cm^3$);
super saturated $CaCl_2/Ca(NO_3)_2$ brine (Brine 4), salt concentration $CaCl_2 \cdot 2H_2O$ 667 g/L and $Ca(NO_3)_2 \cdot 4H_2O$ 2,050 g/L (approximately 13.5 PPG or 1.61 $g/cm^3$).

The only gas used during testing was oxygen free nitrogen. RCE testing was conducted open to air to simulate high $O_2$ presence (which would be the case in the real life, field application). Static autoclave testing utilized a $N_2$ blanket that was purged into the head space four times before final pressurization but the brine was not purged of oxygen and saturation can be assumed.

The metallurgy of the coupons tested was C1018 carbon steel for RCE testing and coupons manufactured from P110 carbon steel were used in HPHT autoclave testing. Coupons were polished mechanically using 320 grit silicon-carbide (SiC) paper, 400 grit SiC paper, then 600 grit SiC paper and rinsed with water then acetone prior to testing.

The rotating cylinder electrode (RCE) tests were conducted in Pyrex™ glass reaction kettles that were heated to 185° F. The testing solution was comprised of 900 mL of heavy brine. The electrode rotation rate was set at 2000 RPM, which generated a wall shear stress of 7.0 Pa. Linear polarization resistance (LPR) measurements were made with a Gamry electrochemical measurement system. The working electrode was made of a 1018 carbon steel (CS) cylinder with a surface area of 3.16 $cm^2$. A Hastelloy C276 electrode was used as a pseudo-reference, and a graphite rod was used as the counter electrode. The corrosion inhibitors were added based on the brine volume after the baseline corrosion rate was monitored for approximately 1.5 hours. Upon completion of the tests, the electrodes were cleaned in an inhibited acid bath according to ASTM G1 C.3.5, and weighed to 0.1 mg.

HPHT static autoclave tests were used to simulate the zero shear conditions for the purpose of evaluating system corrosivity as well as inhibitor performance. The test solution consisted of 800 mL of heavy brine. The head space was cleared of oxygen using 100% nitrogen gas four times before final pressurization into the autoclaves. Two weight loss corrosion coupons fixed on a PTFE cage were used in each autoclave. General corrosion rates were calculated by weight loss measurement according to ASTM G170 (and associated standards referenced therein). Test conditions were constant in all examples with a temperature of 300° F. and 350° F. at a constant pressure of 500 psi; the inhibitors were dosed in at a variety of dose rates ranging from 100 to 300 ppm (based on each inhibitor component) and the tests were run for 7 days.

The surfaces of the electrodes and coupons were analyzed after each test for pitting potential by using a high powered metallurgical microscope. The reflected light microscope was capable of analyzing samples up to 1,000-times magnification. The microscope was mounted with a camera and included brightfield, darkfield, and Differential Interface Controls (DIC) modes.

Example 1: Reference Examples

Uninhibited tests were performed first of all in order to understand the baseline corrosion rate; the following readings, displayed in Table 1, were obtained in the static HPHT autoclave tests at 300 and 350° F.:

TABLE 1

Uninhibited corrosion rate results on heavy brines

| Heavy Brine | 300° F. (mpy) | 350° F. (mpy) | No. |
|---|---|---|---|
| Brine 1 - 10.8 PPG $Ca(NO_3)_2$ | 8.4 | 14.8 | 1.1 |
| Brine 2 - 12.5 PPG $Ca(NO_3)_2$ | 11.5 | 20.6 | 1.2 |
| Brine 3 - 11.6 PPG $CaCl_2$ | 12.6 | 26.8 | 1.3 |
| Brine 4 - 13.5 $Ca(NO_3)_2/CaCl_2$ | 25.4 | 48.2 | 1.4 |

Individual components were then tested to determine further baseline effects. Components were selected from groups 1, 2, 3, and 4 above; namely 1:1 tallow/DETA imidazoline (component Group 1), thioglycolic acid (component Group 2), poly(oxy-1,2-ethanediyl), alpha-isotridecyl-omega-hydroxy-, phosphate (component Group 3), and alkyl ($C_6$) morpholine (component Group 4).

The results of the harshest brine 4 (13.5 $Ca(NO_3)_2/CaCl_2$) at 350° F. are shown below in Table 2. It can be seen that only small decreases in corrosion rate were obtained for the single components and significant corrosion still occurred. Microscopic inspection of the coupons yielded a wholly unacceptable amount of pitting corrosion with frequent pits being >10 μm deep.

TABLE 2

Corrosion rates for heavy brines inhibited with single components at 350° F.

| Corrosion Rate (mpy) | Component Group 1 (ppm) | Component Group 2 (ppm) | Component Group 3 (ppm) | Component Group 4 (ppm) | No. |
|---|---|---|---|---|---|
| 48.2 | 0 | 0 | 0 | 0 | 1.5 |
| 46.1 | 250 | 0 | 0 | 0 | 1.6 |
| 42.3 | 500 | 0 | 0 | 0 | 1.7 |
| 38.9 | 0 | 250 | 0 | 0 | 1.8 |
| 32.6 | 0 | 500 | 0 | 0 | 1.9 |
| 24.2 | 0 | 0 | 250 | 0 | 1.10 |
| 19.8 | 0 | 0 | 500 | 0 | 1.11 |
| 43.5 | 0 | 0 | 0 | 250 | 1.12 |
| 42.1 | 0 | 0 | 0 | 500 | 1.13 |

Example 2: Three Component System

Work continued on three component systems with the aim of identifying the most synergistic relationship between the components. Again work was performed on the harshest brine 4 (13.5 Ca(NO$_3$)$_2$/CaCl$_2$) at 350° F. are shown below in Table 3. Based on these results one can surprisingly see the phosphate ester component leads to high corrosion inhibitor performance, the phosphate ester itself is not a great corrosion inhibitor and it is surprisingly synergistic with the other components within the three component blend. This is not however a linear relationship and various synergistic and antagonistic relationships can be discerned in the data;

1. When a phosphate ester was absent the corrosion rates were in general much higher;
2. When an imidazoline was absent the corrosion rates were high;
3. The uniqueness and high performance of corrosion inhibiting composition is related to the understanding of the relationships between components and identifying the most synergistic ratios.

TABLE 3

Corrosion rates for heavy brine 4 inhibited with three component systems at 350° F.

| Corrosion Rate (mpy) | Component Group 1 (ppm) | Component Group 2 (ppm) | Component Group 3 (ppm) | Component Group 4 (ppm) | No. |
|---|---|---|---|---|---|
| 48.2 | 0 | 0 | 0 | 0 | 2.1 |
| 12.1 | 100 | 100 | 100 | 0 | 2.2 |
| 34.2 | 100 | 100 | 0 | 100 | 2.3 |
| 28.9 | 100 | 0 | 100 | 100 | 2.4 |
| 9.8 | 200 | 200 | 200 | 0 | 2.5 |
| 32.0 | 200 | 200 | 0 | 200 | 2.6 |
| 24.9 | 200 | 0 | 200 | 200 | 2.7 |
| 14.6 | 200 | 200 | 100 | 0 | 2.8 |
| 9.9 | 200 | 100 | 200 | 0 | 2.9 |
| 9.4 | 100 | 200 | 200 | 0 | 2.10 |
| 31.2 | 200 | 200 | 0 | 100 | 2.11 |
| 34.2 | 200 | 100 | 0 | 200 | 2.12 |
| 33.7 | 100 | 200 | 0 | 100 | 2.13 |
| 23.4 | 200 | 0 | 200 | 100 | 2.14 |
| 29.6 | 200 | 0 | 100 | 200 | 2.15 |
| 24.8 | 100 | 0 | 200 | 200 | 2.16 |
| 18.9 | 0 | 200 | 200 | 100 | 2.17 |
| 26.1 | 0 | 200 | 100 | 200 | 2.18 |
| 22.8 | 0 | 100 | 200 | 200 | 2.19 |

Example 3: Use of Phosphate Ester in a Four Component System

The use of phosphate ester in Example 2 led to high corrosion inhibition performance in the three component system. More specific work was performed on phosphate ester chemistries in order to fully understand and leverage this performance. Testing was performed on a great many different phosphate ester chemistries in order to identify the most important types for higher performance corrosion inhibition of heavy brines. Again work was performed on the harshest brine 4 (13.5 Ca(NO$_3$)$_2$/CaCl$_2$) at 350° F. are shown below in Table 4. The results display the data from three different phosphate ester chemistries, namely Phos. Ester 1, which is phosphoric acid 2-ethylhexylester; Phos. Ester 2, which is poly(oxy-1,2-ethanediyl), alpha-isotridecyl-omega-hydroxy-, phosphate; Phos. Ester 3, which is 2-Ethyl hexyl mono/di phosphoric acid ester, acid.

Testing was performed in a four component system consisting of a 1:1 tallow/DETA imidazoline (component group 1), thioglycolic acid (component group 2), phosphate ester (see above for the 3 different types tested) (component group 3), and alkyl (C$_6$) morpholine (component group 4). The following conclusions can be drawn:

1. It can be seen that moving to the four component system resulted in a step change in corrosion inhibition performance with results being consistently below 10 mpy;
2. The presence of the phosphate ester enhances the formulation disproportionately with respect to the other components; however the correct level of phosphate ester is required because in some instances increasing the amount of phosphate ester decreases performance as one begins to move out of the synergistic zone with other components in the formation.

TABLE 4

Corrosion rates for heavy brine 4 inhibited with four component systems focusing on the phosphate ester chemistry at 350° F.

| Corrosion Rate (mpy) | Component Group 1 (ppm) | Component Group 2 (ppm) | Phos Ester 1 (ppm) | Phos Ester 2 (ppm) | Phos Ester 3 (ppm) | Component Group 4 (ppm) | No. |
|---|---|---|---|---|---|---|---|
| 48.2 | 0 | 0 | 0 | 0 | 0 | 0 | 3.1 |
| 8.5 | 100 | 100 | 100 | 0 | 0 | 100 | 3.2 |
| 3.6 | 100 | 100 | 0 | 100 | 0 | 100 | 3.3 |
| 12.8 | 100 | 100 | 0 | 0 | 100 | 100 | 3.4 |

TABLE 4-continued

Corrosion rates for heavy brine 4 inhibited with four component systems focusing on the phosphate ester chemistry at 350° F.

| Corrosion Rate (mpy) | Component Group 1 (ppm) | Component Group 2 (ppm) | Phos Ester 1 (ppm) | Phos Ester 2 (ppm) | Phos Ester 3 (ppm) | Component Group 4 (ppm) | No. |
|---|---|---|---|---|---|---|---|
| 6.4 | 100 | 100 | 200 | 0 | 0 | 100 | 3.5 |
| 2.9 | 100 | 100 | 0 | 200 | 0 | 100 | 3.6 |
| 11.2 | 100 | 100 | 0 | 0 | 200 | 100 | 3.7 |
| 7.8 | 100 | 100 | 300 | 0 | 0 | 100 | 3.8 |
| 3.4 | 100 | 100 | 0 | 300 | 0 | 100 | 3.9 |
| 10.8 | 100 | 100 | 0 | 0 | 300 | 100 | 3.10 |
| 8.9 | 200 | 200 | 100 | 0 | 0 | 200 | 3.11 |
| 2.8 | 200 | 200 | 0 | 100 | 0 | 200 | 3.12 |
| 11.4 | 200 | 200 | 0 | 0 | 100 | 200 | 3.13 |
| 4.6 | 200 | 200 | 200 | 0 | 0 | 200 | 3.14 |
| 2.1 | 200 | 200 | 0 | 200 | 0 | 200 | 3.15 |
| 8.7 | 200 | 200 | 0 | 0 | 200 | 200 | 3.16 |
| 4.5 | 200 | 200 | 300 | 0 | 0 | 200 | 3.17 |
| 2.0 | 200 | 200 | 0 | 300 | 0 | 200 | 3.18 |
| 8.4 | 200 | 200 | 0 | 0 | 300 | 200 | 3.19 |

Example 4: Five Component System

The following components have been tested to show the synergism that is present in the blends once a fifth component is introduced:
1. Imidazoline: this is a primary component of the corrosion inhibitor formulations (component 1), as described above there are many commercially available imidazoline chemistries; in these formulations specified, a 1:1 tallow/DETA imidazoline was used throughout;
2. Morpholine: this is used as a formulation bonding compound (component 4a) and can comprise different species of morpholine and its derivatives; in these formulations specified, an alkyl ($C_6$) morpholine was used throughout;
3. Phosphate ester: this is another primary component of the corrosion inhibitor formulations (component 3) and can comprise different species of phosphate ester; in these formulations specified, poly(oxy-1,2-ethanediyl), alpha-isotridecyl-omega-hydroxy-, phosphate was used throughout;
4. Thioglycolic acid: this is a sulfur synergist and is another preferred embodiment of the corrosion inhibitor (component 2);
5. Ethoxylated amine: these class of molecules are used as bonding surfactants (component 4) and while there can be a very wide range of molecules used in the invention (as described above); in these formulations specified, a coconut fatty acid ethoxylate with 10 moles of EO was used throughout;

The description of the blends tested and the results of the testing can be seen in Table 5. Once again all testing displayed was performed on the harshest brine 4 (13.5 $Ca(NO_3)_2/CaCl_2$) at 350° F. It can be seen by one skilled in the art that a design of experiments (DOE) approach was taken to derive the optimum ratios of the five components in this example. This is necessary because of the complex, multi-order relationship that exists between the components of the corrosion inhibitor system and in order to resolve the most optimum synergies DOE should be used to minimize the time to realize the results.

Corrosion rates were all generally around 1.0 mpy but in some extra-ordinary cases were as low as 0.1 mpy when further adjusting the components to optimum and synergistic concentrations.

TABLE 5

Corrosion rates for heavy brine 4 inhibited with five component systems at 350° F.

| Corrosion Rate (mpy) | Imidazoline (ppm) | Thioglycolic Acid (ppm) | Phos Ester (ppm) | Morpholine (ppm) | Ethox. Amine (ppm) | No. |
|---|---|---|---|---|---|---|
| 48.2 | 0 | 0 | 0 | 0 | | 4.1 |
| 1.1 | 500 | 500 | 300 | 200 | 0 | 4.2 |
| 1.0 | 500 | 500 | 300 | 0 | 200 | 4.3 |
| 0.2 | 500 | 500 | 300 | 0 | 200 | 4.4 |
| 0.9 | 400 | 500 | 400 | 200 | 0 | 4.5 |
| 0.8 | 400 | 500 | 400 | 0 | 300 | 4.6 |
| 0.2 | 400 | 500 | 400 | 0 | 300 | 4.7 |
| 1.1 | 300 | 600 | 300 | 0 | 500 | 4.8 |
| 1.2 | 300 | 600 | 300 | 500 | 0 | 4.9 |
| 0.9 | 300 | 600 | 300 | 0 | 500 | 4.10 |
| 0.1 | 300 | 600 | 300 | 500 | 0 | 4.11 |
| 0.5 | 200 | 500 | 500 | 300 | 0 | 4.12 |
| 0.6 | 200 | 500 | 500 | 0 | 300 | 4.13 |
| 0.6 | 200 | 500 | 500 | 300 | 0 | 4.14 |
| 0.5 | 200 | 500 | 500 | 0 | 300 | 4.15 |

Example 5: Speed of Inhibition

Yet another unique feature of the disclosed corrosion inhibitors is the speed to achieve inhibition. When reviewing the prior art, and testing formulations constructed from the prior art, it is clear that these prior art inventions take several days to achieve equilibrium and reduce the corrosion rate to the final claimed level. It is clearly more desirable to achieve a low corrosion rate as quickly as possible, thus enabling better protection of equipment that comes into contact with heavy brine during oilfield operations.

The currently disclosed corrosion inhibitors have been designed with this in mind and the previously described RCE methodology was able to test and determine the speed to achieve inhibition.

Several corrosion inhibitors were screened in RCE tests in order to determine the speed of inhibition. The LPR results for the RCE tests are shown in Table 6.

TABLE 6

RCE Corrosion Rate and % Inhibition

| Product- | Baseline (mpy) | Corrosion Rate (mpy) 2 hr after CI Dosage (mpy) | Final 3 hr (mpy) | Protection (%) 2 hr after CI Dosage (mpy) | Final 3 hr (mpy) | No. |
|---|---|---|---|---|---|---|
| Chemical A | 90.9 | 33.1 | 4.3 | 63.54 | 95.31 | 5.1 |
| Chemical B | 238.5 | 49.9 | 20.4 | 79.06 | 91.44 | 5.2 |
| Chemical C | 129.8 | 20.5 | 9.6 | 84.18 | 92.59 | 5.3 |
| Chemical D | 60.6 | 36.5 | 27.0 | 39.78 | 55.41 | 5.4 |
| Chemical E | 58.4 | 34.2 | 26.9 | 41.55 | 54.02 | 5.5 |

Chemical A corresponds to # 3 from Table 7.
Chemical B corresponds to # 7 from Table 7.
Chemical C corresponds to # 1 from Table 7.
Chemical D corresponds to # 8 from Table 7.
Chemical E corresponds to # 2 from Table 7.

After the addition of 150 ppm of corrosion inhibitor, corrosion rates dropped to below 10 mpy for Chemical A after just a few hours of testing. Ultimately, Chemical A was able to yield over 95% inhibition. While Chemicals A, B, and C all showed strong final inhibition rates of over 90%, Chemical A performed the strongest as it brought the corrosion rate to 4.3 mpy and a final inhibition rate of 95.31%. All chemicals, even the worse performing from the 5 displayed in this example reduced the corrosion rate dramatically after just 3 hours of testing showing the very fast effect and differentiating corrosion film formation of this invention.

Examples of the heavy brine corrosion inhibitor formulations illustrating different compositional aspects of this invention are listed in Table 7 in their final solvent system.

TABLE 7

Final invention formulation examples

| Formulation | #1 | #2 | #3 | #4 | #5 | #6 | #7 | #8 | #9 | #10 | #11 | #12 | #13 | #14 |
|---|---|---|---|---|---|---|---|---|---|---|---|---|---|---|
| Imidazoline from Example 4 [wt.-%] | 5 | 5 | 5 | 4 | 4 | 4 | 3 | 3 | 3 | 3 | 2 | 2 | 2 | 2 |
| Morpholine [wt.-%] | 2 | 0 | 0 | 2 | 0 | 0 | 0 | 5 | 0 | 5 | 3 | 0 | 3 | 0 |
| Phosphate Ester from Example 4 [wt.-%] | 3 | 3 | 3 | 4 | 4 | 4 | 3 | 3 | 3 | 3 | 5 | 5 | 5 | 5 |
| NP9 [wt.-%] | 0 | 5 | 5 | 0 | 4 | 4 | 0 | 3 | 0 | 3 | 5 | 0 | 0 | 5 |
| Alcohol ethoxylate [wt.-%] | 5 | 0 | 0 | 5 | 0 | 0 | 3 | 0 | 3 | 0 | 0 | 5 | 5 | 0 |
| Thiourea [wt.-%] | 5 | 0 | 5 | 5 | 0 | 5 | 6 | 0 | 6 | 0 | 5 | 0 | 5 | 0 |
| Thioglycolic acid [wt.-%] | 0 | 5 | 0 | 0 | 5 | 0 | 0 | 6 | 0 | 6 | 0 | 5 | 0 | 5 |
| Ethoxylated amine from Example 4 [wt.-%] | 0 | 2 | 2 | 0 | 3 | 3 | 5 | 0 | 5 | 0 | 0 | 3 | 0 | 3 |
| Alcohol [wt.-%] | 55 | 55 | 55 | 55 | 55 | 55 | 55 | 55 | 55 | 55 | 55 | 55 | 55 | 55 |
| Water [wt.-%] | 25 | 25 | 25 | 25 | 25 | 25 | 25 | 25 | 25 | 25 | 25 | 25 | 25 | 25 |

NP9 was a nonyl phenol with 9 moles ethylene oxide. The alcohol ethoxylate was a $C_{10}/C_{12}$ alcohol with 4-8 moles of ethylene oxide. The alcohol is methanol.

The invention claimed is:

1. A process for inhibiting corrosion in a heavy brine having a density of 1.15 to 2.65 g/cm³, comprising the step of adding a composition comprising
   at least one imidazoline, wherein the at least one imidazoline corresponds to formula III

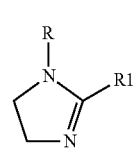

(III)

wherein
R is —H, or —$C_2H_4OH$, and
R1 is a $C_3$ to $C_{29}$ aliphatic hydrocarbon group
at least one sulfur synergist, and
at least one phosphate ester,
to the heavy brine having a density of 1.15 to 2.65 g/cm³.

2. The process according to claim 1, wherein R1 is a $C_7$ to $C_{21}$ hydrocarbon group.

3. The process according to claim 1, wherein R1 is alkyl or alkenyl.

4. The process according to claim 1, wherein the at least one sulfur synergist is selected from the group consisting of thioglycolic acid, sodium thiosulfite, ammonium thiosulfite, ammonium thiosulfate, sodium thiosulfate, potassium thiosulfate, potassium thiosulfite, thiourea, sodium thiocyanate, ammonium thiocyanate, and calcium thiocyanate, sodium thioglycolate, ammonium thioglycolate, 1,2-diethylthiourea, propylthiourea, 1,1-diphenylthiourea, thiocarbanilide, 1,2-dibutylthiourea, dithiourea thioacetamide, thionicotimide, or thiobenzamide, 2-Mercpatoethanol, 3-(Methylthio)propanal, thioacetic acid, cyste-amine, 3-Chloro-1-propanethiol, 1-mercapto-2-propanol, 2,3-Dimercapto-1-propanol, 2-Methoxyethane-thiol, 3-Mercapto-1-propanol, 2,3-Dimercapto-1-propanol, 1-Thio-glycerol, 1,3-Propane-dithiol, mercaptosuccinic acid, Cysteine, N-Carbomoyl-L-cysteine, N-Acetylcysteamine, 4-Mercapto-1-butanol, 1-Butanedithiol, 1,4-Butanedithiol, 2,2'-Thiodietanethiol, 4-Cyano-1-butanethiol, Cyclopantanethiol, 1,5-Pentanedithiol, 2-Methyl-1-butanethiol, 2,3,5,6-Tetrafluorobenzenethiophenol, 4-Chlorothiophenol, 2-Mercaptophenol, Thiophenol, Cyclohexylthiol, 4-Mercaptobenzoic acid, Thiosalicylic acid, 2-Ethylhexane thiol and compounds of the formula $C_nH_{2n+1}SH$ (n=1 to 10).

5. The process according to claim 1, wherein the at least one phosphate ester is of the formula:

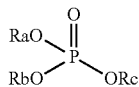

wherein Ra, Rb and Rc are each H or a hydrocarbon group which may contain oxygen or nitrogen atoms with a carbon atom number ranging from 1 to 49.

6. The process according to claim 5, wherein at least one of Ra, Rb and Rc are ethoxy groups.

7. The process according to claim 5, wherein the carbon atom number in the hydrocarbon group ranges from 4 to 30.

8. The process according to claim 5, wherein at least one of Ra, Rb and Rc is selected from the group consisting of alkyl or alkenyl groups.

9. The process according to claim 5, wherein Ra, Rb and Rc are terminated by a hydrogen, hydroxyl, benzyl or carboxylic acid group.

10. The process according to claim 5, wherein at least one of Ra, Rb and Rc is substituted with a non-terminal carboxyl, hydroxyl or secondary amine group.

11. The process according to claim 1, wherein the composition further comprises at least one solvent system wherein the at least one solvent system is selected from the group consisting of water, monohydrate alkyl alcohols with 1 to 8 carbon atoms, dihydric alcohols having 2 to 6 carbon atoms and $C_1$ to $C_6$ alkyl ethers of the alcohols.

12. The process according to claim 11, wherein the solvent system is selected from the group consisting of water, methanol, ethanol, monoethylene glycol, triethylene glycol, 2-butoxyethanol, 2-ethylhexanol, isopropanol, pentanol, butanol and mixtures thereof.

13. The process according to claim 11, wherein the concentration of the at least one solvent system is from 20 to 80 wt.-%.

14. The process according to claim 1, wherein the composition further comprises a bonding surfactant according to the formula

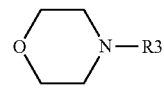

wherein
R3 is H, $C_1$ to $C_{18}$ alkyl or $C_1$ to $C_{18}$ alkyl amine.

15. The process according to claim 14, wherein the concentration of the at least one bonding surfactant is from 1 to 20 wt.-%.

16. The process according to claim 1, wherein the composition further comprises a bonding surfactant selected from the group consisting of nonyl phenol ethoxylates with 4 to 100 ethoxy groups.

17. The process according to claim 1, wherein the composition further comprises a bonding surfactant selected from the group consisting of ethoxlated alcohols according to R4-O-(A-O)$_x$—H wherein
R4 is an aliphatic $C_8$ to $C_{18}$ hydrocarbon residue,
A is an ethylene group, and
x is a number from 2 to 100.

18. The process according to claim 17, wherein R4 is alkyl or alkenyl and may either be straight chain or branched.

19. The process according to claim 17, wherein R4 comprises from 12 to 16 carbon atoms.

20. The process according claim 17, wherein x is a number from 7 to 40.

21. The process according to claim 1, wherein the composition further comprises a bonding surfactant selected from the group consisting of ethoxylated amines having 6 to 18 carbon atoms and 2 to 100 ethoxy groups.

22. The process according to claim 1, wherein the concentration of the at least one imidazoline is from 1 to 20 wt.-%.

23. The process according to claim 1, wherein the concentration of the at least one sulfur synergist is from 1 to 10 wt.-%.

24. The process according to claim 1, wherein the concentration of the at least one phosphate ester is 1 to 30 wt.-%.

25. The process according to claim 1 wherein the heavy brine is an aqueous solution comprising at least one salt selected from the group consisting of NaCl, $CaCl_2$, $Ca(NO_3)_2$, KCl, $CaBr_2$, ZnBr, $ZnI_2$, and mixtures thereof.

26. The process according to claim 1, wherein the density of the heavy brine is from 1.4 to 2.65 g/cm³.

27. The process according to claim 1, wherein from 100 to 10,000 mg/L of the composition is added to the heavy brine having a density of 1.15 to 2.65 g/cm³.

* * * * *